(12) United States Patent
Lake

(10) Patent No.: US 6,507,701 B2
(45) Date of Patent: Jan. 14, 2003

(54) TRUCK STORAGE BOX

(76) Inventor: Matthew E. Lake, 112 Players Dr., Easley, SC (US) 29642

( * ) Notice: Subject to any disclaimer, the term of this patent is extended or adjusted under 35 U.S.C. 154(b) by 0 days.

(21) Appl. No.: 10/083,928

(22) Filed: Feb. 27, 2002

(65) Prior Publication Data

US 2002/0175530 A1 Nov. 28, 2002

Related U.S. Application Data

(63) Continuation-in-part of application No. 09/769,808, filed on Jan. 26, 2001.

(51) Int. Cl.$^7$ ................................................ B60N 3/12
(52) U.S. Cl. .................. 396/37.6; 296/37.1; 296/26.11
(58) Field of Search ......................... 296/37.6, 100.18, 296/100.62, 105, 26.11, 37.1, 57.1; 224/404

(56) References Cited

U.S. PATENT DOCUMENTS

| | | | | |
|---|---|---|---|---|
| 4,728,017 A | * | 3/1988 | Mullican | 296/37.6 |
| 4,750,773 A | * | 6/1988 | Chapline et al. | 296/37.6 |
| 4,828,312 A | * | 5/1989 | Kinkel et al. | 296/37.6 |
| 4,938,398 A | * | 7/1990 | Hallsen | 296/37.6 |
| 5,169,200 A | * | 12/1992 | Pugh | 296/37.6 |
| 5,186,510 A | * | 2/1993 | Stapp | 296/37.6 |
| 5,299,722 A | * | 4/1994 | Cheney | 296/37.6 |
| 5,340,004 A | * | 8/1994 | Moore | 296/37.1 |
| 5,439,150 A | * | 8/1995 | Trahms | 224/404 |
| 5,464,264 A | * | 11/1995 | Wilson | 296/37.6 |
| 5,544,671 A | | 8/1996 | Phillips | 135/88.14 |
| 5,588,631 A | | 12/1996 | Yee | 248/553 |
| 5,601,206 A | | 2/1997 | Haas et al. | 220/527 |
| 5,628,442 A | * | 5/1997 | Wayne | 224/42.33 |
| 5,738,262 A | * | 4/1998 | Andrini | 296/37.1 |
| 5,743,589 A | * | 4/1998 | Felker | 296/37.6 |
| 5,788,319 A | | 8/1998 | Pruitt | 296/164 |
| 5,853,116 A | | 12/1998 | Schreiner | 224/404 |
| 5,893,597 A | * | 4/1999 | Rider | 296/37.6 |
| 5,902,000 A | * | 5/1999 | Wold | 296/26.11 |
| 5,967,392 A | * | 10/1999 | Niemi et al. | 224/404 |
| 5,988,195 A | | 11/1999 | Kaestner et al. | 135/144 |
| 6,003,923 A | | 12/1999 | Scott et al. | 296/37.6 |
| 6,006,971 A | | 12/1999 | Coleman et al. | 224/404 |
| 6,030,018 A | * | 2/2000 | Clare et al. | 296/37.6 |
| 6,070,775 A | | 6/2000 | Tolley et al. | 224/404 |
| 6,151,933 A | | 11/2000 | Lentini | 70/159 |
| 6,170,724 B1 | * | 1/2001 | Carter et al. | 296/37.6 |
| 6,174,012 B1 | * | 1/2001 | Saffold | 296/37.6 |
| 6,237,361 B1 | | 5/2001 | Broussard | 62/457.9 |
| 6,257,640 B1 | * | 7/2001 | Leitner et al. | 296/37.6 |
| 6,349,865 B1 | * | 2/2002 | Tolley et al. | 296/37.6 |
| 2001/0042987 A1 | * | 11/2001 | Getzschman et al. | 296/37.6 |
| 2002/0014505 A1 | * | 2/2002 | Lance et al. | 296/37.6 |
| 2002/0101088 A1 | * | 8/2002 | Rigau | 296/37.6 |

* cited by examiner

*Primary Examiner*—Kiran Patel
(74) *Attorney, Agent, or Firm*—Joseph T. Guy; Nexsen Pruet Jacobs & Pollard, LLC

(57) ABSTRACT

A truck storage box having a frame of sufficient size to fit inside a truck bed with a hinged top. Said frame will have a means to pivot from a position parallel to the bottom of the truck bed to a position perpendicular to the bottom of said truck bed. A collapsible section is attached to the frame allowing for storage when the frame is in the parallel position. The frame shall contain said collapsible section when the frame is in the perpendicular position.

15 Claims, 5 Drawing Sheets

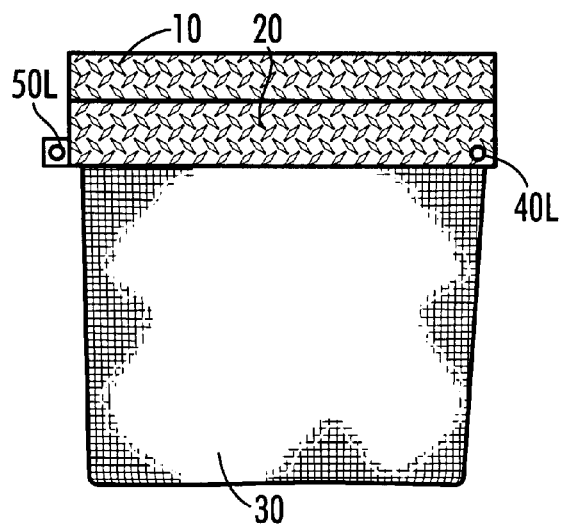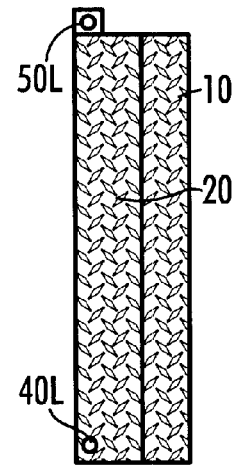
Fig.5    Fig.6
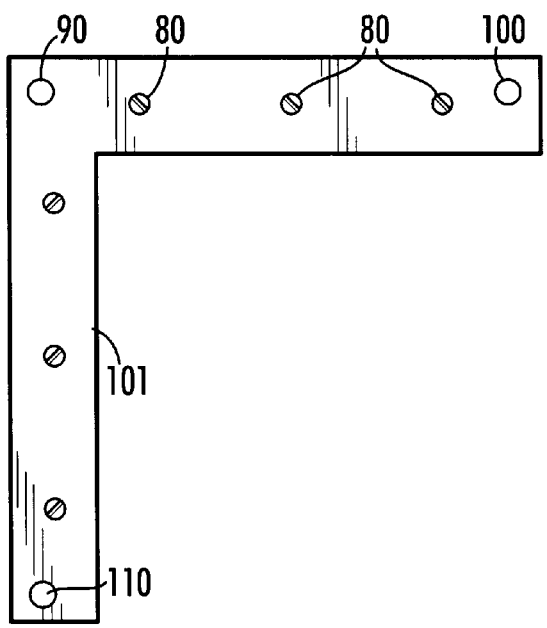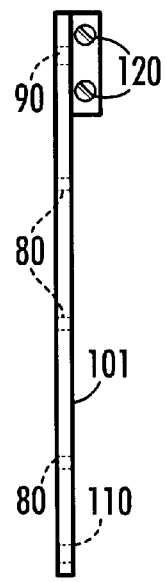
Fig.7    Fig.8

TRUCK STORAGE BOX

CROSS-REFERENCE TO RELATED APPLICATIONS

This application is a continuation-in-part and claims priority to U.S. patent application Ser. No. 09/769,808, filed Jan. 26, 2001, which is pending.

FIELD OF INVENTION

This invention relates to truck storage boxes, specifically to improve convenience.

BACKGROUND

Since the first truck was made for use by non-commercial applications, the need for a confined storage was needed. Over the years many variations of storage boxes have been devised. A simple box with a lid attached to the inside of the truck bed was the beginning. Next came the "tool box", which is mounted to extend over the sides of the truck bed from the driver's side to the passenger side. This box was attached similar to the original design.

All these storage boxes are very useful but they do present the owner a problem while not in use; they consume 25 to 30 percent of the truck's bed space. As these boxes are attached in a manner that is not conducive to easy removal, this loss of space has prevented many from purchasing one of these storage boxes.

Many attempts have been made to resolve this problem of providing a storage box in the bed of a pickup truck which can be removed rapidly or folded. They are all lacking for various reasons.

U.S. Pat. No. 4,749,226, issued to Heft, and U.S. Pat. No. 4,828,312, issued to Kinkel et al., both provide a rigid box which folds into the bed of the truck. While this invention offers certain advantages the bed of the truck is covered which would severely limit the carrying of small items such as gravel, dirt or mulch since the folded box would be covered and could possibly be damaged or rendered inoperative by small debris become lodged in the hinges. Furthermore, any heavy item would have to be lifted over the folded box, or placed on the box, which is undesirable.

U.S. Pat. No. 5,853,116, issued to Schreiner, provides a rigid box which folds into the tailgate of the truck. This has some of the same problems as the invention by Heft. Specifically, any heavy item on the tail gate may damage the folded storage device.

U.S. Pat. No. 6,070,775, issued to Tolley, describes a collapsible pouch yet the storage capacity is extremely limited.

SUMMARY

It is an object of the present invention to provide a truck storage box that while not in use, first collapses the bottom into the top. The top then folds to occupy a minimum of the truck bed.

A particular feature of the present invention is the ability to pivot the frame from an up or in-use position to a down or closed position Another particular feature of the present invention is the ability to secure the frame of the storage box in the up or down position A particular advantage of the present invention is provide by a collapsible pouch that provides a dry and secure storage and the ability to be stored while not being used.

These and other advantages, as will be realized from the description herein, are provided in a collapsible storage box for a truck bed. The collapsible storage box comprises a frame and a top pivotally attached to the frame. A pivot is attached to the frame wherein the pivot is received by a pivot void attached to the truck bed and in which the pivot can rotate. A pin is attached to the frame and capable of maintaining the frame in a fixed position. In one embodiment the pin is capable of being reversibly received by a pin void which is attached to the truck bed. A collapsible pouch is connected to the frame wherein when the pin is received by the pin void the collapsible pouch forms a storage area and when the pin is not received by the pin void the collapsible pouch is reversibly received in the frame. In one embodiment the pin is a member which has variable length and can secure the frame in a discrete position.

Yet another advantage is provided in a collapsible storage box system for attachment to a truck bed. The system comprises a mounting bracket attachable to the truck bed wherein the mounting bracket comprises a pivot void and a pin void. A frame is provided which comprises a pivot wherein the pivot is receivable in the pivot void. A pin is attached to the frame wherein the pin is reversibly receivable in the pin void. A collapsible pouch is attached to the frame wherein the collapsible pouch forms a storage area when the pin is received in the void and the collapsible pouch is collapsed for storage in the frame when the pin is not received by the pin void.

Yet another advantage is provided in a collapsible storage box system for attaching a storage box to a truck bed. The system comprises a pivot void and a pin void integral to the truck bed. A rectangular frame is provided which comprises a pivot wherein the pivot is received in the pivot void. A pin is attached to the frame wherein the pin is reversibly receivable in the pin void. A collapsible pouch is attached to the frame wherein the collapsible pouch forms a storage area when the pin is received in the pin void and the collapsible pouch is stored in the frame when the pin is not received by the pin void.

DESCRIPTION OF DRAWINGS

FIG. 5 illustrates a side view as seen from the left side of the storage box with the box in the open position.

FIG. 6 illustrates a side view as seen fro m the left side of the storage box with the box in the down position.

FIG. 7 illustrates a side view of the storage box mount.

FIG. 8 illustrates a top view of the storage box mount.

DETAILED DESCRIPTION

Accordingly, the object or advantage of my invention is to provide a truck storage box that accommodates the storage need of a non-commercial user but allows the full use of the truck bed while the storage box is not in use. The folding and collapsing features allow the box to remain in the vehicle at all times. While the box is in the open position the storage capacity is similar to that of current products. When the box is in the closed or folded position the box consumes less than 4 percent of the truck bed capacity.

Further objects and advantages of my invention will become apparent from a consideration of the drawings and ensuing description.

Figure 1:
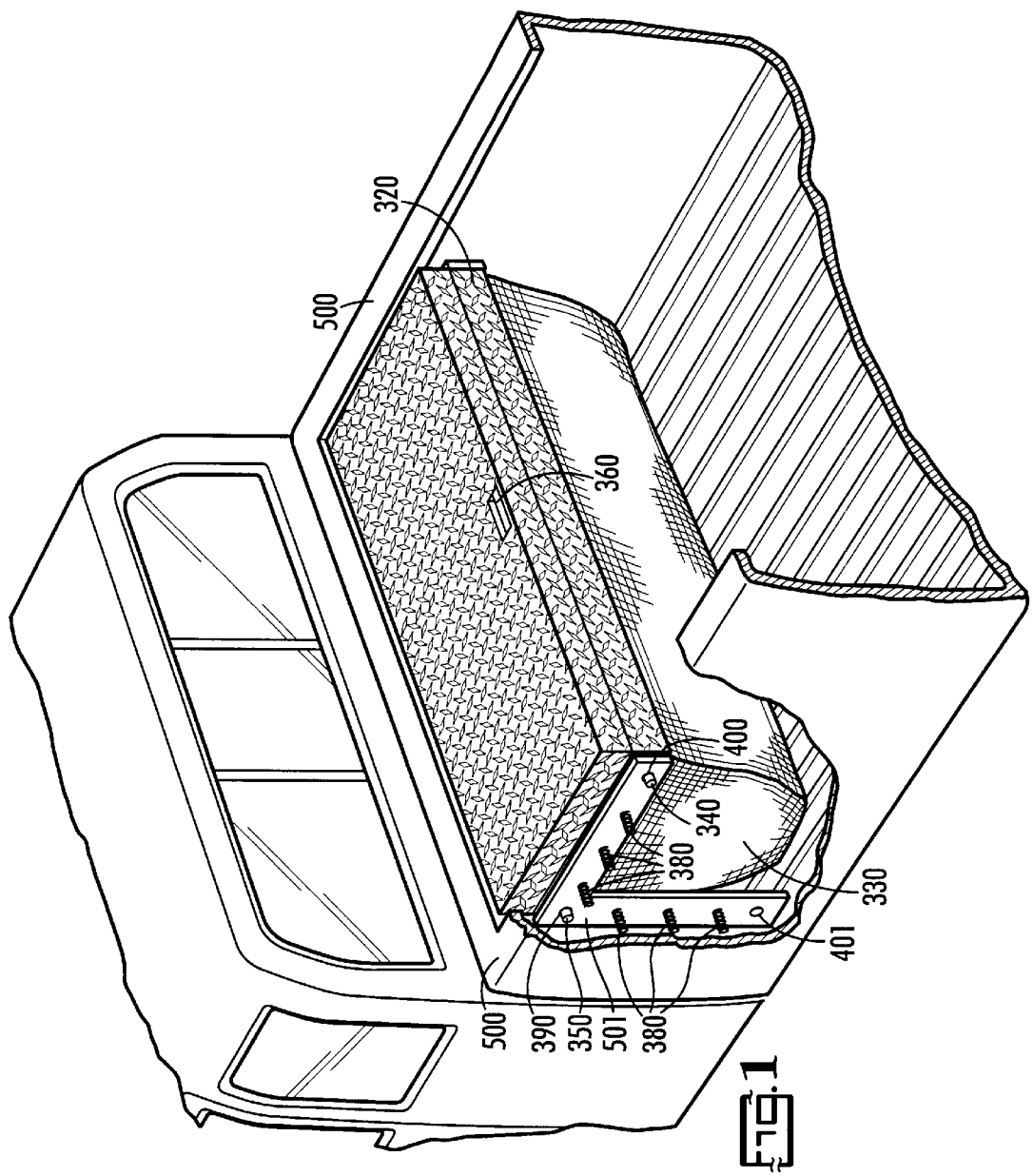
FIG. 1 provides a partially exploded view of an embodiment of the present invention as it would be visualized when in position for storing items.

An embodiment of the present invention is provided in FIG. 1. In FIG. 1, the truck bed 500 is shown in partial cutaway view. The storage box is mounted inside the pickup truck bed. The storage box comprises a rectangular frame 320 and top 310. The top is preferably pivotally mounted to the frame. In the embodiment illustrated the top is pivotally attached to the side of the frame closest to the front of the truck bed 500. It is also contemplated that the top could be pivotally mounted to one side of the frame. It is also contemplated that the top could be in two sections with each section pivotally mounted to the center of the frame thereby allowing a top section to be opened from either side of the truck. A latch 360 allows the top to be securely closed yet easily opened by manipulation of the latch. The latch may also comprise a key lock mechanism if desired. The type of latch is not limiting. Any latch typically employed for reversibly securing a pivotally attached top to a frame is suitable for the present teachings. It would be apparent that multiple tops could utilize a common latch or multiple latches.

Secured to the frame 320 is a primary pivot 350. The pivot is received by a pivot void 390 in a mounting bracket 501 thereby forming an axis of rotation for the frame 320 and attached elements. The primary pivot 350 may be fixed or retractable into the frame. In a particularly preferred embodiment the primary pivot is retractable to allow the entire frame and attached elements to be removed. A fixed primary pivot is suitable for permanent installation. In another embodiment the primary pivot is a hinge. Also secured to the frame 320 is a locking pin 340. When the box is in an upright position, parallel to the floor of the truck bed for storing items, the locking pin 340 is received by an upper locking void 400. The locking pin 340 is a retractable pin which can be reversible engaged with the upper locking void 400. When the box is to be used for storage the retractable pin is withdrawn from the upper locking void 400 and the frame and attached elements are rotated on the primary pivot 350 in the pivot void 390. When the retractable pin is aligned with a lower locking void 401 the locking pin 340 is persuaded into the lower locking void 401 thereby securing the box in a position substantially parallel to the front of the truck bed. A collapsible pouch 330 is secured to the frame and extends downward to form a receiving pouch. The collapsible pouch is designed to be easily folded, similar to a film material, such that when the frame is rotated downward the collapsible pouch is easily stored in the area formed by the walls of the frame. The mounting bracket 501 is attached to the interior of the truck bed by attachment devices 380 such as threaded members, rivots, welds or the like. In an alternate embodiment the mounting bracket 501 may be a portion of the truck bed 500 with the locking voids and pivot void integral to the interior wall of the truck bed.

Figure 2:
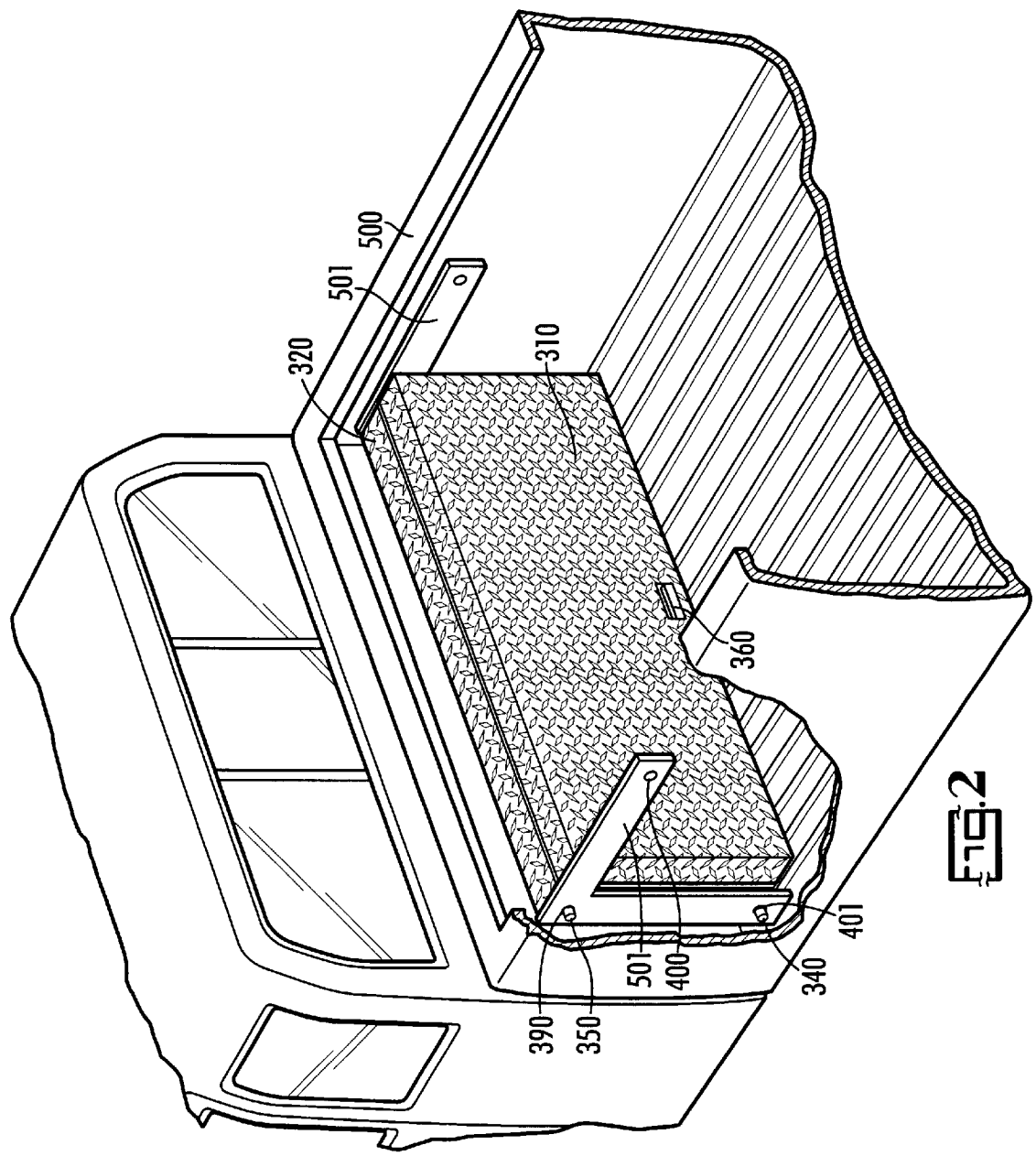
FIG. 2 provides a view of the embodiment of FIG. 1 as it would be visualized when folded to make the bed of the truck available.

The embodiment of FIG. 1 is shown in FIG. 2 as it would appear when folded down. The mounting bracket 501 is secured to the frame of the truck. The primary pivot 350 is received by the pivot void 390. The locking pin 340 is received by the lower locking void 401. The pouch, which is not visible in this view, is folded and in storage within the area formed by the frame 320 and top 310.

Figure 3:
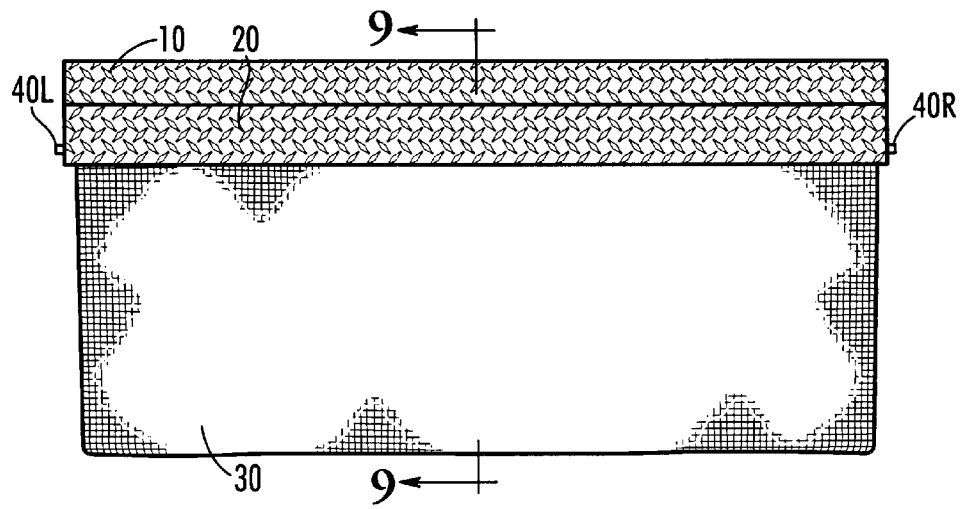
FIG. 3 illustrates a front view of the storage box in the open position.

An embodiment of the present invention is illustrated in partial exploded view in FIG. 3 as it would be in position for storing items in the storage box. The storage box has a frame 20 constructed of a rigid material; metallic or of polymer. The frame 20 will be sized to fit within the bed rails of each type of truck being manufactured by the automotive industry while leaving clearance for the top 10, the storage box mount FIG. 7 and FIG. 8, and for the side shown in FIG. 3. Position locking pins 40R and 40L are shown at each end of the frame. These pins are used to lock the frame into an up or down position. The operation is detailed in the following sections.

Figure 4:
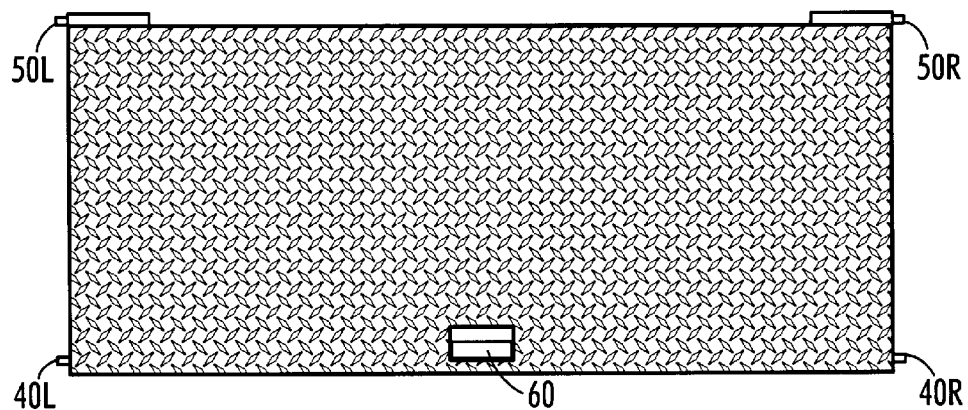
FIG. 4 illustrates a top view of the storage box in the open position, which is also seen as the top view when the box is in the down position.

FIG. 4 is a top view of the truck storage box. This view is seen in either the open in-use position or in the closed stored position. The frame 20 is tilted on pivots 50R and 50L thereby allowing the storage box to be rotated between positions. Items 40L and 40R operate to lock the storage box in position. Located on the top 10 is a keyed locking device 60. This locking device serves as a latch for the top as well as a lock for security.

FIG. 5 is a side view of the truck storage box as seen from the left side. This detail shows the pivot 50 attached to an optional tab 51 which can be provided to allow additional clearance for the frame 20 to pivot. A hinge 70 for opening the top 10 is provided. The locking pin 40 is shown which serves to secure the frame 20 into either the open or closed position. The bottom section 30 is a collapsible pouch that is both waterproof and durable.

FIG. 6 is aside view of the truck storage box as seen in the closed or stored position from the left side. The frame 20 has been pivoted on pivot 50L and is locked into position locking pivot 40L being received in a void.

FIG. 7 is a side view of an embodiment of the truck storage box mount 101. The mount is secured to the truck bed by an attachment device such as along the horizontal shown as item 80. This mount allows the truck storage box frame to pivot via the pivot void 90. Pivot 50 (FIG. 4) is inserted into the pivot void 90 as a means for rotation. The open position locking void 100 is to position the frame 20 (FIG. 4) in a locked and open or up position. The frame 20 (FIG. 4) is in the closed and locked position by pivoting in a clockwise motion as seen from the left and locked into position. This closed position is maintained by inserting the locking pin 40 (FIG. 4) into the closed position void 110. In an alternate embodiment the pivot void 90, open locking void 100, and closed pivot void 110 may be integral to the truck bed thereby eliminating the separate mount 101. In another alternate embodiment the closed pivot void is optional and the pivot positioned such that the box does not require locking in the closed position.

FIG. 8 is a top view of the truck storage box mount. An attachment tab 120 is provided for attachment at the bottom of the truck bed.

Figure 9:
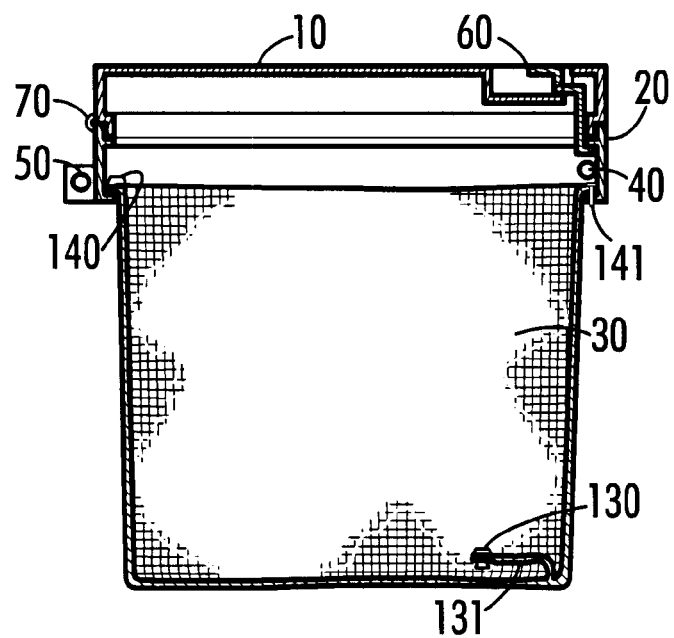
FIG. 9 illustrates a cross section, taken along ling 9—9 of FIG. 3.

FIG. 9 is a cross-sectional view taken along line 9—9 of FIG. 3. In FIG. 9 the top 10, frame 20 and collapsible bottom are as illustrated previously. The latch 60 is shown in detail to comprise a rotating member which engages with a lip of the frame 20. The positioning pin 40 is shown to protrude into the interior to a certain degree to allow the positioning pin to be grasped and withdrawn into the interior when the box is to be rotated on the rear pivot 50. A hinge 70 is provided for pivotally mounting the top 10 to the frame 20. An optional tab 131 integral to the collapsible bottom 30 comprises an optional attachment device 130 for easily securing the collapsible bottom in a folded position. The attachment device is secured to an attachment device receiver 140 thereby withdrawing the collapsible bottom into the frame. The attachment device and attachment device receiver may be a snap couple, hook and loop mechanism or other devices as known in the art. The collapsible bottom is secured to the frame. In one embodiment the collapsible bottom is secured to the frame by attachment elements 141 such as threaded members, rivets and the like. In one embodiment, the attachment device receiver 140 may be an attachment element.

The collapsible pouch is attached to the frame and hangs there below during use of folds up and is stored in the frame when not in use. The collapsible pouch is preferably made from a flexible sheet or material that is durable and substantially weather-proof, wear resistant or tear-resistant. Particularly preferred materials include neoprene, nylon, polyethylene terephthalate, or multiple layers of materials which, taken together, form a sheet with the desired properties. Ballistic grade nylon is particularly suitable due to the strength and weight. The collapsible pouch may comprise straight walls with a substantially square bottom. In an alternate embodiment the bottom of the collapsible pouch may be rounded. The pouch is preferably formed with seams as would be realized to one of ordinary skill in the art. The collapsible pouch is preferably not easily stretched or punctured since this would cause the collapsible pouch to degrade over time.

The method of utilizing the inventive device would be readily apparent from the descriptions herein. The truck storage box must first be installed in the truck for use. In one embodiment the mount, such as that illustrated in FIG. 7, is attached to the truck bed. The storage box is then attached to the mount by inserting the pivot device 50L and 50R into the pivot holes 90. The box is then operated by opening the top 10 and retracting the locking pins 40R and 40L to allow the frame 20 to be pivoted into either the up or down position. The locking pins are then moved into the locating holes 100 for the up position or 110 for the down position. When the frame 20 is in the up position the collapsible container 30 is allowed to be open for access through the top 10. When the frame 20 is in the down position the collapsible container 30 is collapsed and contained within the frame 20 and the top 10.

There are various possibilities with regard to the means to pivot the truck storage box as illustrated in all figures. These drawings provide the reader with the basic operation and function of the concept. There are various possibilities with regard to the positioning system referred to as locking pins and locking pin locators. These drawings provide the reader with the basic operation and function of the concept. The materials used for construction may be of metal, plastic or other material suitable to provide necessary structural support. Thus the truck storage box of the present invention provides a secure, dry storage space for truck owners while allowing a greater use of the truck bed capacity.

The invention has been described with particular reference to the preferred embodiments. A skilled artisan would realize embodiments and variations which are different from the preferred embodiments but which are within the scope of the claims which are appended hereto.

What is claimed is:

1. A collapsible storage box for a truck bed comprising:
   a frame;
   a top pivotally attached to said frame;
   a pivot attached to said frame wherein said pivot is received by a pivot void which is attached to said truck bed and in which said pivot can rotate;
   a pin attached to said frame wherein said pin is capable of reversibly securing said frame in a predetermined position;
   a collapsible pouch connected to said frame wherein when said pin is received by said pin void said collapsible pouch forms a storage area and when said pin is not received by said pin void said collapsible pouch is reversibly received in said frame.

2. The collapsible storage box for a truck bed of claim 1 further comprising a latch for reversible securing said top in a closed position on said frame.

3. The collapsible storage box for a truck bed of claim 1 wherein said pin is a retractable pin.

4. The collapsible storage box for a truck bed of claim 1 further comprising a mount wherein said mount comprises said pivot void and said mount is attached to said truck bed.

5. The collapsible storage box for a truck bed of claim 4 wherein said mount further comprises a pin void.

6. The collapsible storage box for a truck bed of claim 5 wherein said pin is reversibly receivable by a second pin void wherein when said pin is received by said second pin void said collapsible pouch is received in said frame.

7. A collapsible storage box system for attachment to a truck bed comprising:
   a mounting bracket attachable to said truck bed wherein said mounting bracket comprises a pivot void and a pin void;
   a frame comprising a pivot wherein said pivot is receivable in said pivot void;
   a pin attached to said frame wherein said pin is reversibly receivable in said pin void; and
   a collapsible pouch attached to said frame wherein said collapsible pouch forms a storage area when said pin is received in said pin void and said collapsible pouch is collapsed for storage in said frame when said pin is not received by said pin void.

8. The collapsible storage box system of claim 7 wherein said mounting bracket further comprises a second pin void capable of reversibly receiving said pin.

9. The collapsible storage box system of claim 7 wherein said pin is retractable.

10. The collapsible storage box system of claim 7 wherein said frame is rectangular.

11. The collapsible storage box system of claim 7 further comprising a top pivotally attached to said frame.

12. The collapsible storage box system of claim 11 wherein said top further comprises a latch.

13. A collapsible storage box system for attaching a storage box to a truck bed comprising:
   a pivot integral to said truck bed;
   a rectangular frame attached to said pivot wherein said frame rotates on said pivot;
   a pin attached to said frame wherein a pin is reversibly receivable in said pin void; and
   a collapsible pouch attached to said frame wherein said collapsible pouch forms a storage area when said pin is received in said pin void and said collapsible pouch is stored in said frame when said pin is not received by said pin void.

14. The collapsible storage box system for attaching a storage box to a truck bed of claim 13 further comprising a second pin void wherein said pin is receivable in said second pin void and said frame is secured in a position with said collapsible pouch therein.

15. The collapsible storage box system for attaching a storage box to a truck bed of claim 13 further comprising a top pivotally attached to said frame.

* * * * *